United States Patent [19]

Iizuka et al.

[11] Patent Number: 5,137,577
[45] Date of Patent: * Aug. 11, 1992

[54] CEMENT ADDITIVE

[75] Inventors: Masanori Iizuka; Tatsuya Mizunuma; Fuzio Yamato; Toshiharu Kojima; Akitoshi Tuji, all of Wakayama, Japan

[73] Assignee: Kao Corporation, Tokyo, Japan

[*] Notice: The portion of the term of this patent subsequent to Oct. 16, 2007 has been disclaimed.

[21] Appl. No.: 675,267

[22] Filed: Mar. 26, 1991

[30] Foreign Application Priority Data

Mar. 29, 1990 [JP] Japan ................................. 2-83264

[51] Int. Cl.$^5$ .................... C04B 24/28; C04B 22/06; C04B 24/04
[52] U.S. Cl. .................................. 106/823; 106/810; 106/819; 524/5; 524/342; 524/344; 524/559
[58] Field of Search .................... 106/810, 819, 823; 524/5, 342, 344, 559

[56] References Cited

U.S. PATENT DOCUMENTS 4,963,190 10/1990 Mizunuma et al. ............. 106/724

FOREIGN PATENT DOCUMENTS 6683344 4/1987 Japan .
63-5346 2/1988 Japan .
1-270550 10/1989 Japan .

Primary Examiner—William R. Dixon, Jr.
Assistant Examiner—Anthony J. Green
Attorney, Agent, or Firm—Birch, Stewart, Kolasch & Birch

[57] ABSTRACT

An additive to cement comprises a granular zinc salt of a copolymer of an olefin having 2 to 8 carbon atoms and an ethylenically unsaturated dicarboxylic anhydride, prepared by reacting the powder of the copolymer with powder of zinc oxide or zinc hydroxide in the presence of water.

27 Claims, No Drawings

CEMENT ADDITIVE

FIELD OF INDUSTRIAL APPLICATION

The present invention relates to an admixture for cement or cement mix. More particularly, the present invention is concerned with a cement admixture having a remarkably improved storage stability under water which can prevent the lowering with time of the workability of concrete, mortar or cement paste as a hydraulic cement mix and enables the handling and workability to be improved.

PRIOR ART

In a conventional cement mix comprising a mixture of cement with water, sand, gravel and admixture, the mix gradually loses its flowability with the progress of physical and chemical agglomeration after kneading, so that the handling and workability decrease. For this reason, the cement mixture has the drawback that the period of time in which it can be handled is limited.

In order to solve this problem, proposals have hitherto been made on a method of preventing the lowering in the workability of various cement mixes. Examples of the proposal include a method of maintaining the flowability of the cement mix for a long period of time wherein cement is mixed with, as a cement admixture, a pulverized copolymer of a lower olefin with maleic anhydride (Japanese patent Publication No. 5346/1988), an inert metal complex of a copolymer of a lower olefin with an ethylenically unsaturated dicarboxylic acid anhydride (Japanese patent Laid-Open No. 83344/1987) or a mixture comprising a copolymer of a lower olefin with an ethylenically unsaturated dicarboxylic acid anhydride and zinc oxide or hydroxide (Japanese patent Laid-Open No. 270550/1989) to gradually bring about the effect of improving the flowability through a reaction of the admixture with the alkali contained in the cement.

However, the above described pulverized copolymer of a lower olefin with maleic anhydride is usually stored and used in the form of a dispersion in water. This copolymer brings about a mold hydrolysis even in water during storage. For this reason, the anhydride ring opens during storage through hydrolysis by the time it is used as an admixture for cement, so that the inherent sustained release performance cannot be exhibited in use.

The Ca$^{++}$ complex, for example, described in the Japanese patent Laid-Open No. 83344/1987, tends to deteriorate in a water-reducing agent mix system. Specifically, it has drawbacks such as large solubility, tackiness, instability and lowering in the capability of maintaining the flowability. Further, in the mix disclosed in the Japanese patent Laid-Open No. 270550/1989, zinc oxide or hydroxide precipitates in a water-reducing agent mix system during storage for a long period of time, which makes it difficult to form a zinc salt of the copolymer. This causes the capability of maintaining the flowability, i.e., sustained release performance, to be lowered, so that there occurs the problem of storage stability

SUMMARY OF THE INVENTION

The present inventors have made intensive studies with a view to solving the above-described drawbacks of the prior art and, as a result, have found that a zinc salt of a copolymer, prepared by heat-reacting a particulate copolymer mainly composed of an olefin having 2 to 8 carbon atoms and an ethylenically unsaturated dicarboxylic acid anhydride with a particulate zinc oxide or Zn(OH)$_2$ in the presence of water does not lower the sustained release performance even while stored with water for long, but allows for easy handling and workability.

The invention provides an additive to cement which comprises a granular zinc salt of a copolymer of an olefin having 2 to 8 carbon atoms and an ethylenically unsaturated dicarboxylic anhydride, prepared by reacting the powder of the copolymer with powder of zinc oxide or zinc hydroxide in the presence of water.

The reaction may be conducted in the medium of water or in the form of a slurry of the powder in an organic solvent in the presence of water.

It is preferable that the granular zinc salt of the copolymer has a size of 0.1 to 50 microns and the granular zinc salt of the copolymer has a molecular weight of 500 to 50,000.

The invention further provides a cement additive composition which comprises the granular zinc salt of the copolymer as defined above and a water-reducing agent, preferably at a weight ratio of 1:99 to 99:1.

It is preferable that the water reducing agent is a water-soluble salt of a copolymer of an olefin having 2 to 8 carbon atoms and an ethylenically unsaturated dicarboxylic anhydride.

The invention provides an aqueous slurry which comprises 20 to 40 percent by weight as the solid matter of the granular zinc salt of the copolymer as defined above.

The invention then provides a method of dispersing a cement mixture, which adding to the cement mixture an effective amount of the additive or the additive composition, preferably in an amount of 0.1 to 10 percent by weight.

The invention moreover provides a cement composition which comprises an amount of 0.1 to 10 percent by weight of the additive as defined above, water, sand and gravel.

The mechanism through which an improvement in the storage stability according to the present invention can be attained is believed to be as follows.

In general, a copolymer mainly composed of an olefin having 2 to 8 carbon atoms and an ethylenically unsaturated dicarboxylic acid anhydride is attacked in water by a hydroxide ion to open the anhydride ring, thereby forming a carboxylic acid or its salt. If the carboxylic acid or its salt is soluble in water, this portion is dissolved in water. As a result, a new surface of the copolymer is exposed, and this new surface is attacked by the hydroxide ion and dissolved in water. The copolymer loses the sustained release performance through the repetition of the procedure. In the invention, however, the copolymer previously converted into a corresponding zinc salt is stabilized and does not dissolve in water even when attacked by the hydroxide ion.

The present invention will now be described in more detail.

In the copolymer used in the present invention and mainly composed of an olefin having 2 to 8 carbon atoms and an ethylenically unsaturated dicarboxylic acid anhydride, it is also possible to add a third monomer copolymerizable with the olefin having 2 to 8 carbon atoms and the ethylenically unsaturated dicarboxylic acid anhydride. In order to exhibit the performance of the present invention, it is necessary that 30 to 60 parts by weight of ethylenically unsaturated dicarboxylic acid anhydride be contained in 100 parts by weight of the copolymer.

Examples of the olefin having 2 to 8 carbon atoms include ethylene, propylene, n-butene, isobutylene, n-pentene, cyclopentene, 2-methyl-1-butene, n-hexene, 2-methyl-1-pentene, 3-methyl-1-pentene, 4-butyl-1-pentene, 2-ethyl-1-butene, diisobutylene and their mixtures, among which isobutylene is preferred. Examples of the ethylenically unsaturated dicarboxylic acid anhydride include maleic anhydride, itaconic anhydride and citraconic anhydride, among which maleic anhydride is preferred.

The average molecular weight of the copolymer used in the present invention is preferably about 500 to 50,000. When the average molecular weight is below the above-described range, the dispersive power is insufficient. On the other hand, when it is above the above-described range, the copolymer functions as a coagulant rather than as a dispersant, so that no effect of preventing slump loss is attained. The average molecular weight of the copolymer used in the present invention refers to a weight-average molecular weight determined by aqueous gel permeation chromatography. The mean particle diameter of the zinc salt of the copolymer is preferably 0.1 to 50 μm. When the mean particle diameter is less than 0.1 μm, the sustained release rate is so high that it is difficult to obtain a slump holding performance of concrete. On the other hand, when it is larger than 50 μm, the sustained release rate is so low that the amount of addition should be increased and the copolymer localizes. This has an unfavorable adverse effect on the properties of concrete.

The process for preparing a particulate zinc salt of a copolymer which features the present invention will now be described.

In the invention, the zinc salt of the copolymer can be obtained by dispersing and reacting powder of the copolymer and powder of ZnO or $Zn(OH)_2$ with each other in the presence of water. The reaction is an acid-alkali reaction in the solid phase. The reaction may be conducted in an aqeuous slurry or in a slurry in an organic solvent including water. The organic solvent should be one in which the copolymer is not soluble. It is preferred that the organic solvent have a lower boiling point than water or that it can form an azeotropic mixture with water. For example, it includes an aromatic solvent such as benzene, xylene, toluene, ethylbenzene, n-butylbenzene, t-butylbenzene and isopropylbenzene, a lower ester solvent such as methyl acetate, ethyl acetate, isopropyl acetate and methyl propionate and a ketone solvent such as acetone, methylethylketone and diethylketone. A solvent may be used in combination with another. The solvent may be preferably used in such an amount that the content of the copolymer may range from 5 to 35 percent by weight in the slurry.

In the preparation of the organic solvent slurry, the copolymer is dispersed in a solvent and then ZnO or $Zn(OH)_2$ and water are added to the dispersion, followed by the reaction. Alternatively the copolymer is obtained by precipitation polymerization in an organic solvent, and then ZnO or $Zn(OH)_2$ and water are added to the resulting slurry of the copolymer without removing the organic solvent. The reaction proceeds by heating the slurry while the organic solvent used for the polymerization is removed.

The latter is preferable, because the zinc salt can be obtained with the same particle size and shape as the copolymer provided by the precipitation polymerization. Water is added so that the entirety of the organic solvent may be azeotropically distilled out, and the resulting aqueous slurry may have 5 to 60 percent by weight, preferably 20 to 40 percent by weight, of the zinc salt of the copolymer.

The zinc salt of a copolymer prepared according to this process does not necessitate a drying step, exhibits excellent storage stability when mixed with a water-reducing agent, and excellent sustained release performance in concrete. Although there is no particular limitation on the particle diameter of the copolymer anhydride of a copolymer and ZnO or $Zn(OH)_2$, it is preferred that the particle diameter be as small as possible from the viewpoint of the reactivity.

The ZnO or $Zn(OH)_2$ should be added in an amount corresponding to a neutralization equivalent of the anhydride of the copolymer (1/78 mole of ZnO or $Zn(OH)_2$ per mole for COOH group). When the amount is less than the neutralization equivalent, a large amount of the copolymer remains unreacted, which causes the capability of maintaining the flowability to be lowered. On the other hand, the addition of the ZnO or $Zn(OH)_2$ in an amount exceeding the neutralization equivalent is unnecessary because the ZnO or $Zn(OH)_2$ remaining unreacted precipitates.

It will suffice when the solid matter to be reacted in water exists in the system in such a concentration that it can be dispersed in water, and the pH of the water dispersion should be 6 to 9. If the pH is outside this range, the formed zinc salt of the copolymer dissolves, which causes the storage stability to become poor.

Although the reaction temperature may be any one as far as the reaction intended in the present invention proceeds, it is preferably 50° to 95° C. when the workability is taken into consideration. Although there is no particular limitation on the pressure in the system, an atmospheric pressure is desired from the viewpoint of profitability.

The reaction product thus prepared is pulverized to such a particle diameter that it exhibits an optimal sustained release performance through adjustment of mixing and kneading conditions of concrete. In general, the particle diameter is 0.1 to 50 μm. The reaction product is optionally filtered and used in the form of a water slurry (solid content: usually 20 to 40% by weight).

The yield of the thus prepared zinc salt of a copolymer as identified by the infrared analysis (through the use of a peak at ν of 1750 to 1800 $cm^{-1}$) is usually 60 to 100%. In the use of this product as a cement admixture, it is generally used in the form of a mixture with a water-reducing agent, an air entrainer, a rust preventive, a high-early-strengthening agent, etc., though it may be used alone.

In particular, it is preferred to use the zinc salt of a copolymer in combination with a water-reducing agent. Examples of the water-reducing agent which may be used in combination of the zinc salt of a copolymer include one comprising a condensate of naphthalenesulfonic acid with formaldehyde, one comprising a condensate of methylnaphthalenesulfonic acid with formaldehyde, one comprising a sulfonated melamine, one comprising a ligninsulfonic acid, one comprising a polycarboxylic acid (trade name: Work Series; a product of Nippon Zeon Co., Ltd.), one comprising a partial ester of polycarboxylic acid (trade name: Chupol; a product of Takemoto Oil and Fat Co., Ltd.), one comprising aniline-sulfonic acid (trade name: Paric; a product of Fujisawa Pharmaceutical Co., Ltd.), a phenolic water-reducing agent, etc.

Examples of the method of adding the cement admixture of the present invention to a cement mix include dissolution in kneading water and addition to a preliminarily kneaded cement mix. In this case as well, it is possible to use the cement admixture in combination with other cement additives, for example, an air entrainer, a fluidizer, a water-proofing agent, an inflating agent, a glass fiber, a steel fiber, a fly ash, a silica fume and a blast furnace slag.

As is apparent from Table 2, the particulate zinc salts of a copolymer according to the present invention (products Nos. 1 to 13), even when stored in the form of a mixture with a water-reducing agent at 40° C. for one year, exhibit a slump holding effect of concrete equal to that immediately after the preparation (immediately after mixing with a water-reducing agent), and are superior in the slump holding effect to the calcium salt to a copolymer (comparative product No. 14) and the mixture of a copolymer with ZnO (comparative product No. 15,) each after keeping for one year at 40° C.

EXAMPLES

The present invention will now be described in more detail by way of the following Examples, though it is not limited to these Examples only.

EXAMPLE 1

Preparation of zinc salt of copolymer

Starting materials listed in Table 1 were used, and a particulate ZnO or $Zn(OH)_2$ in an amount corresponding to a neutralization equivalent was added and dispersed in a particulate copolymer of isobutylene with maleic anhydride (having an average molecular weight of about 9,000 as determined by GPC) dispersed in water. The mixture was agitated and allowed to react under reaction conditions specified in Table 1 to prepare a zinc salt of a copolymer (Product Nos. 1 to 11 of the present invention).

For comparison, a calcium salt of a copolymer (product No. 14 corresponding to a product described in the Japanese patent Laid-Open No. 83344/1987) and a mixture of a copolymer with ZnO (product No. 15corresponding to a product described in the Japanese patent Laid-Open No. 270550/1989) were prepared. The thus prepared zinc salt of a copolymer of isobutylene with maleic anhydride according to the present invention and comparative products were each mixed with a water-reducing agent (calcium salt of a high condensate of $\beta$-naphthalenesulfonic acid with formalin) in a weight ratio of 15:85 in terms of the carboxylic acid in the copolymer to prepare a suspension having a concentration of 30% on solid basis, and the pH value of the system was adjusted to 9. This suspension was stored in a thermostatic chamber at 40° C., taken out after a predetermined period of time, and subjected to a concrete test for measurement of the performance.

Concrete Test

The flowability of concrete and the effect of preventing the lowering in the flowability were measured by the slump test according to JIS A-1101 through the use of concrete mixed with the following materials:
Materials used:

cement: normal portland cement,
specific gravity: 3.17
fine aggregate: river sand obtained from
the Kino river,
specific gravity: 2.57
coarse aggregate: crushed stone obtained
from Takarazuka,
specific gravity: 2.56 mixing:
water/cement ratio=55.0%
fine aggregate=48.0%
cement content=320 kg/m$^3$ Concrete was kneaded according to the above-described formulation by making use of a 100l tilting barrel mixer. Specifically, 50 l of a concrete material and a predetermined sample were put in the mixer, and the mixture was kneaded at a high speed for 2 min and then agitated at a constant speed of 4 rpm to measure a slump after a predetermined period of time.

The results are given in Table 2.

EXAMPLE 2

A one liter separable flask equipped with an stirrer, a gas inlet tube, thermometer and condenser provided at its end with nitrogen gas bag, was charged with 607 parts of toluene, 68.6 parts of maleic anhydride and 3.4 parts of ethylcellulose, Ethylcellulose N-7, trademark of Hercules, having an ethoxy content of 48 percent and a molecular weight, calculated as polystyrene, of 62,000 . The mixture was heated up to 70 degree C., and stirred in the nitrogen gas atmosphere. 6.8 parts of 2,2'-azobisisobutylonitrile were added thereto for a polymerization initiator, and then isobutylene gas was introduced through the gas inlet into the solution. With the reaction temperature of 70 degree C., 45 parts at isobutylene gas, the mole ratio of which to maleic anhydride was 1.14, was continuously fed over a period of 3 hours. Just after starting introducing isobutylene gas, the reaction mixture was found to whiten and the nitrogen gas bag did not become inflated. This showed that the gas was well absorbed into the reaction mixture to polymerize efficiently. After the gas had been fed, the product mixture was stirred for a further two hours. Then it was cooled to obtain a slurry in toluene of a copolymer of isobutylene and maleic anhydride having a weight-average molecular weight of 14,000, determined by gel permeation chromatography, calculated as sodium polystyrene sulfonate, and a particle size of 0.35 micron.

362.5 parts of the copolymer slurry, 28.5 parts, being equivalent to the maleic anhydride units, of zinc oxide, and 199.5 parts of ion-exchanged water were introduced into a 1 liter separable flask equipped with a stirrer, a thermometer, and water-separating equipment. The reaction bath was heated up to 110 degree C. to proceed with the reaction between the copolymer and zinc oxide and distill out toluene azeotropically with water. The azeotropic mixture distilled at 85 degree C. was composed of toluene and water in a ratio of 80:20. Toluene had been distilled out over 4 hours to convert the slurry to an aqueous slurry (No. 12). The product exhibited no absorption of an anhydrous group in its IR spectrum, which showed that the reaction between the copolymer and zinc oxide had proceeded quantitatively.

EXAMPLE 3

Example 2 was experimentally followed, except for dispersing 90.6 parts of copolymer particles of isobutylene and maleic anhydride having a particle size of 0.5 micron and a molecular weight of about 9,000 in 271.9 parts of ethyl acetate to obtain a slurry in ethyl acetate of the copolymer, to obtain an aqueous slurry of zinc salt of the copolymer (No. 13).

Table 1 (figures in parentheses represent a mixing weight ratio)

| No. | Particle diameter of starting materials (μm) | | | Reaction conditions | | | Properties of product | | |
|---|---|---|---|---|---|---|---|---|---|
| | isobutylene - maleic anhydride copolymer | ZnO | Zn(OH)$_2$ | number of revolutions of agitating blade (rpm) | temp. (°C) | time (hr) | as prepared (μm) | as pulverized (μm) | solid content (%) |
| 1 | 560 (100) | 0.4 (52.9) | | 150 | 95 | 11 | 595 | 0.8 | 30 |
| 2 | 380 (100) | | 0.1 (64.5) | 300 | 80 | 29 | 450 | 1.2 | 10 |
| 3 | 56 (100) | 0.1 (52.9) | | 200 | 75 | 45 | 65 | 0.9 | 20 |
| 4 | 56 (100) | | 0.5 (64.5) | 300 | 90 | 9 | 70 | 0.7 | 15 |
| 5 | 5.3 (100) | 0.3 (52.9) | | 150 | 95 | 9 | 6.6 | 0.3 | 35 |
| 6 | 5.3 (100) | 0.7 (26.5) | 0.6 (32.3) | 150 | 75 | 45 | 6.8 | 0.6 | 15 |
| 7 | 2.1 (100) | | 0.5 (64.5) | 100 | 95 | 9 | 2.8 | 0.9 | 12 |
| 8 | 1.3 (100) | | 0.2 (64.5) | 150 | 95 | 10 | 1.6 | 0.8 | 10 |
| 9 | 0.5 (100) | 0.1 (52.9) | | 100 | 90 | 10 | 0.6 | - | 36 |
| 10 | 0.3 (100) | 0.1 (26.5) | 0.1 (32.3) | 200 | 90 | 11 | 0.4 | - | 37 |
| 11 | 0.5 (100) | 0.1 (52.9) | | 150 | 110 | 3 | 0.6 | - | 36 |
| 12 | 0.35 | | | | | 4 | 0.4 | | 40 |
| 13 | 0.5 | | | | | 3.5 | 0.6 | | 40 |

Table 2

| | Product No. | Amt. of addition (%) | Change of slump with time (cm) | | | | | | Setting time of product after keeping for 1 year at 40 °C (h-m) | |
|---|---|---|---|---|---|---|---|---|---|---|
| | | | product immediately after preparation | | | product after keeping for 1 year at 40 °C | | | | |
| | | | immediately after preparation | after 30 min | after 60 min | immediately after preparation | after 30 min | after 60 min | initial setting | final setting |
| Products of the present invention | 1 | 0.5 | 20.4 | 20.5 | 20.6 | 20.7 | 20.4 | 20.2 | 7-20 | 8-55 |
| | 2 | 0.5 | 20.3 | 20.4 | 20.4 | 20.7 | 20.2 | 20.0 | 7-23 | 8-57 |
| | 3 | 0.5 | 20.0 | 20.1 | 20.4 | 20.6 | 20.2 | 20.1 | 7-23 | 8-54 |
| | 4 | 0.5 | 19.9 | 20.1 | 20.2 | 20.4 | 20.3 | 20.1 | 7-21 | 8-54 |
| | 5 | 0.5 | 20.6 | 20.7 | 20.6 | 20.9 | 20.7 | 20.2 | 7-20 | 8-56 |
| | 6 | 0.5 | 20.3 | 20.6 | 20.7 | 20.5 | 20.1 | 20.1 | 7-23 | 8-53 |
| | 7 | 0.5 | 20.1 | 20.1 | 20.4 | 20.6 | 20.5 | 20.3 | 7-25 | 8-51 |
| | 8 | 0.5 | 20.9 | 20.7 | 20.9 | 21.0 | 20.9 | 20.4 | 7-25 | 8-49 |
| | 9 | 0.5 | 20.1 | 20.2 | 20.1 | 20.9 | 20.3 | 20.1 | 7-24 | 8-51 |
| | 10 | 0.5 | 20.4 | 20.5 | 20.5 | 20.9 | 20.2 | 20.0 | 7-26 | 8-56 |
| | 11 | 0.5 | 20.3 | 20.2 | 20.2 | 20.4 | 20.3 | 20.1 | 7-21 | 8-56 |
| | 12 | 0.5 | 20.5 | 20.0 | 20.0 | 20.4 | 20.4 | 20.0 | 7-25 | 8-50 |
| | 13 | 0.5 | 20.4 | 20.0 | 19.8 | 20.5 | 20.3 | 20.0 | 7-30 | 8-56 |
| Comp. product | 14 | 0.5 | 20.4 | 20.6 | 20.4 | 23.1 | 21.0 | 18.9 | 7-29 | 8-58 |
| | 15 | 0.5 | 20.3 | 20.4 | 20.1 | 23.3 | 20.6 | 18.6 | 7-33 | 8-57 |

We claim:

1. A cement additive comprising a granular zinc salt of a copolymer comprising an olefin having 2 to 8 carbon atoms and an ethylenically unsaturated dicarboxylic anhydride, prepared by reacting the copolymer with zinc oxide or zinc hydroxide in a reaction medium comprising water, wherein the copolymer, zinc oxide or zinc hydroxide are each in a powder form.

2. The cement additive as claimed in claim 1, wherein the copolymer and the zinc oxide or zinc hydroxide are in the form of a slurry and the reaction medium comprises an organic solvent in water.

3. The cement additive as claimed in claim 1, wherein said granular zinc salt of said copolymer had a size of 0.1 to 50 microns.

4. The cement additive as claimed in claim 1, wherein said granular zinc salt of said copolymer has a molecular weight of 500 to 50,000.

5. A cement additive composition, which comprises the cement additive as defined in claim 1, and a water-reducing agent.

6. The composition as claimed in claim 5, wherein the weight ratio of the cement additive to the water-reducing agent is 1:99 to 99:1.

7. The composition as claimed in claim 5, wherein the water-reducing agent is comprised of a water-soluble salt comprising an olefin having 2 to 8 carbon atoms and an ethylenically unsaturated dicarboxylic anhydride.

8. An aqueous cement additive slurry, which comprises 20 to 40 percent by weight as solid matter the cement additive as defined in claim 1.

9. A cement mixture, which comprises 0.1 to 10 percent by weight of the cement additive as defined inn claim 1, water, cement, sand, and gravel.

10. The cement additive as claimed in claim 1, wherein said copolymer comprises a monomer copolymerizable with said olefin and said ethylenically unsaturated dicarboxylic acid anhydride.

11. The cement additive as claimed in claim 1, wherein said ethylenically unsaturated dicarboxylic acid anhydride is present in an amount of 30 to 60 parts by weight per 100 parts by weight of said copolymer.

12. The cement additive as claimed in claim 1, wherein said olefin is selected from the group consisting of ehtylene, propylene, n-butene, isobutylene, n-pentene, cyclopentene, 2-methyl-1-butene, n-hexene, 2-methyl-1-pentene, 3-methyl-1-pentene, 4-butyl-1-pentene, 2-ethyl-1-butene, diisobutylene and mixtures thereof.

13. The cement additive as claimed in claim 1, wherein said olefin is isobutylene.

14. The cement additive as claimed in claim 1, wherein said ethylenically unsaturated dicarboxylic acid anhydride is selected from the group consisting of maleic anhydride, itaconic anhydride and citraconic anhydride.

15. The cement additive as claimed in claim 1, wherein said ethylenically unsaturated dicarboxylic acid anhydride is maleic anhydride.

16. The cement additive as claimed in claim 2, wherein said organic solvent is one in which said copolymer is not soluble.

17. The cement additive as claimed in claim 2, wherein said organic solvent has a lower boiling point than water, or is capable of forming an azeotropic mixture with water.

18. The cement additive as claimed in claim 2, wherein said organic solvent is an aromatic organic solvent.

19. The cement additive as claimed in claim 18, wherein said aromatic organic solvent is selected from the group consisting of benzene, xylene, toluene, ethylbenzene, N-butylbenzene, t-butylbenzene and isopropylbenzene.

20. The cement additive as claimed in claim 2, wherein said organic solvent is a lower ester.

21. The cement additive as claimed in claim 20, wherein said lower ester is selected from the group consisting of methyl acetate, ethyl acetate, isopropyl acetate and methyl propionate.

22. The cement additive as claimed in claim 2, wherein said organic solvent is a ketone.

23. The cement additive as claimed in claim 22, wherein said ketone is selected from the group consisting of acetone, methylethylketone and diethylketone.

24. The cement additive as claimed in claim 2, wherein said organic solvent is a combination of organic solvents.

25. The cement additive as claimed in claim 2, wherein said organic solvent is present in such an amount that the content of said copolymer is in the range from 5 to 35 percent by weight in said slurry.

26. The cement additive as claimed in claim 1, wherein said zinc oxide or zinc hydroxide is added in an amount corresponding to a neutralization equivalent of said anhydride of said copolymer.

27. A cement mixture, which comprises 0.1 to 10 percent by weight of the cement additive composition as defined in claim 5, water, cement, sand and gravel.

* * * * *